June 30, 1970 R. I. KEMP ET AL 3,517,496
FRUIT PICKING DEVICE AND METHOD
Filed March 30, 1967 3 Sheets-Sheet 1
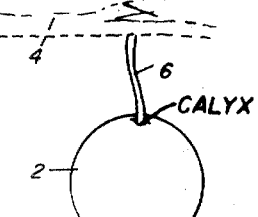
FIG. IA
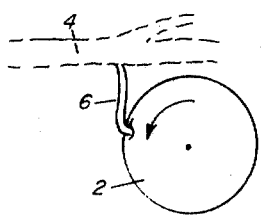
FIG. IB
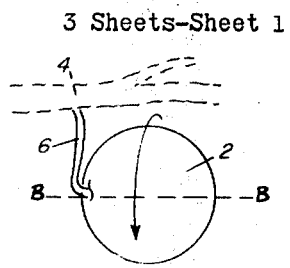
FIG. IC
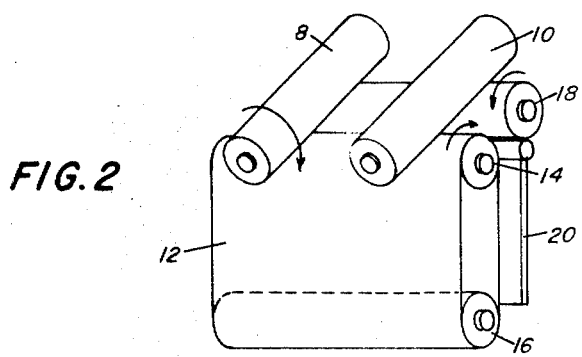
FIG. 2
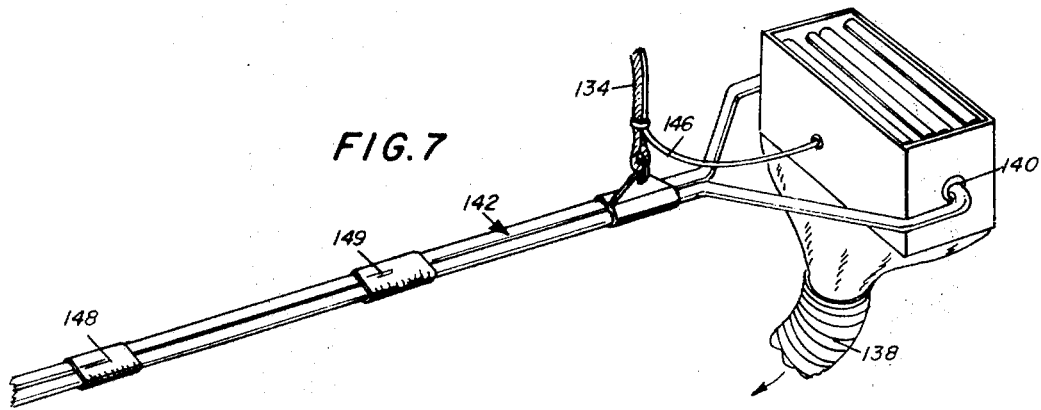
FIG. 7
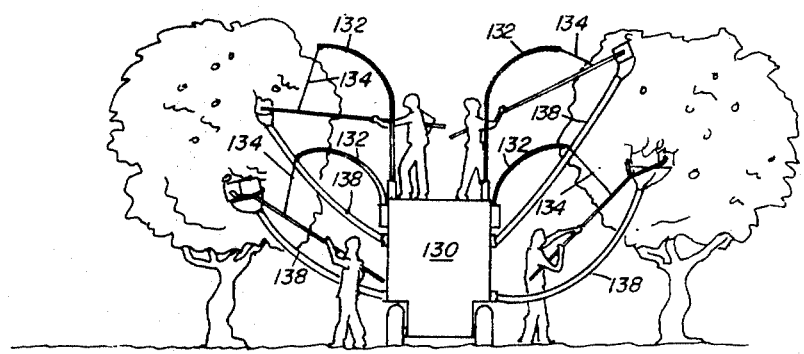
FIG. 8
INVENTORS
ROBERT I. KEMP
EDMUND T. SCHAFFER
BY Beall and Jones
ATTORNEYS

INVENTORS
ROBERT I. KEMP
EDMUND T. SCHAFFER

BY Beale and Jones
ATTORNEYS

June 30, 1970  R. I. KEMP ET AL  3,517,496
FRUIT PICKING DEVICE AND METHOD
Filed March 30, 1967  3 Sheets-Sheet 3

INVENTORS
ROBERT I. KEMP
EDMUND T. SCHAFFER
BY Beall and Jones
ATTORNEYS

United States Patent Office 3,517,496
Patented June 30, 1970

3,517,496
FRUIT PICKING DEVICE AND METHOD
Robert I. Kemp, 5812 Gamble Drive 32808, and Edmund T. Schaffer, 2412 Reef Court 32805, both of Orlando, Fla.
Filed Mar. 30, 1967, Ser. No. 627,015
Int. Cl. A01g 19/08
U.S. Cl. 56—328          20 Claims

ABSTRACT OF THE DISCLOSURE

A device for picking fruit which engages the fruit by a series of movable members which first rotate the hanging fruit about a first horizontal axis in order to orient generally horizontally the fruit's central axis, and then rotate the fruit about a horizontal axis perpendicular to the first horizontal axis in order to twist the fruit from its stem. Cooperating rollers effect the first rotation of the fruit, and a driven belt operating in conjunction with a platelike member produces the twisting action.

BACKGROUND OF THE INVENTION

This invention is applicable to any operation involving the harvesting of produce of the type which hangs downwardly on a stem from a bearing plant such as a tree. It is ideally suited to the harvesting and picking of fruits such as oranges. The relatively small size of the subject harvester renders it capable of being supported on a hand-manipulated pole so that workmen may readily move it to a group of hanging fruits.

Within the prior art, there are numerous devices which are intended to perform the same function as the present invention. It is thought, however, that none of these previous efforts has resulted in a harvesting device which possesses the advantages of the apparatus set forth hereinbelow.

Some of the prior art fruit harvesters involve a cutting blade which is used to sever the stem which connects the fruit to a tree. This approach has its greatest difficulty in manipulating the fruit accurately so that the stem will be cut at the proper place. Furthermore, the construction of these devices usually makes it necessary to approach the fruits individually rather than in groups, and thus it requires more time for removing the fruit from a tree.

Another category of prior art devices in this field are those which simply pull the fruit from its branch by producing tension in the stem. These devices have their shortcomings also. As would be expected, such an operation often requires an excessive amount of tension in the stem which may sometimes leave part of the branch attached to the fruit or tear the skin of the fruit causing damage and making it unsuitable for shipment.

A third type of mechanical fruit picker relies upon the twisting of the fruit about a vertical axis aligned with its stem. The twisting of the stem rather than the tension within the stem produces the ultimate severance of the fruit. In this type of device, a substantial amount of the twisting action is taken by the stem itself so many revolutions are sometimes required before the stem is broken or separated from the fruit. There is no assurance that the point of breakage will be at the fruit, so portions of the stem are often withdrawn with the fruit.

SUMMARY

The invention set forth in the following specification differs from the prior art in that it combines the pulling and twisting actions in a most effective way to separate produce from the plant which bears it. Essentially this is done by first manipulating the fruit from its initial position (FIG. 1A) to a position where the central axis of the fruit through the stem connection (the "stem axis") is rotated to a substantially horizontal position (FIG. 1B). Then, while exerting a downward pull on the fruit, it is rotated about its stem axis in order to create tensile stresses in the stem and a twisting action at the juncture of the stem and the fruit. This separates the fruit from the stem with little difficulty.

By removing the fruit from its stem in the above-defined fashion, the shortcomings of the prior art devices are eliminated. Since this apparatus does not rely solely on tension in the stem to separate the fruit, relatively light gripping forces are exerted on the fruit so that bruising and other damages are greatly minimized. The manipulation which takes place causes the bending of the stem immediately adjacent the stem-fruit connection, so that very little twisting occurs in the vertically hanging stem and most twisting is confined to the point of juncture between the fruit and the stem. This assures separation at the fruit and eliminates the need for further processing for removal of the stem.

With the foregoing in mind, it will be appreciated that a primary object of this invention is to provide apparatus which will remove a fruit from the bearing plant or tree in a manner that will minimize damage to the fruit and guarantee a clean separation of the fruit from its stem and the tree.

Another object is to provide relatively light, simple and convenient apparatus which may be maneuvered readily by workmen in the course of fruit harvesting.

These and other objects will be appreciated from a study of the drawings and of the following description, which represent but one of numerous possible embodiments of this invention.

DESCRIPTION OF THE DRAWINGS

FIGS. 1A, 1B and 1C illustrate diagrammatically the manipulation of the fruit as it is engaged by the various elements of the disclosed apparatus;

FIG. 2 is a diagrammatic illustration of the fruit-manipulating elements of this invention;

FIG. 7 is a perspective view of a fruit picker mounted on a pole; and

FIG. 8 is a view of an apparatus employing multiple fruit picking devices.

DESCRIPTION OF THE INVENTION

Figure 3:
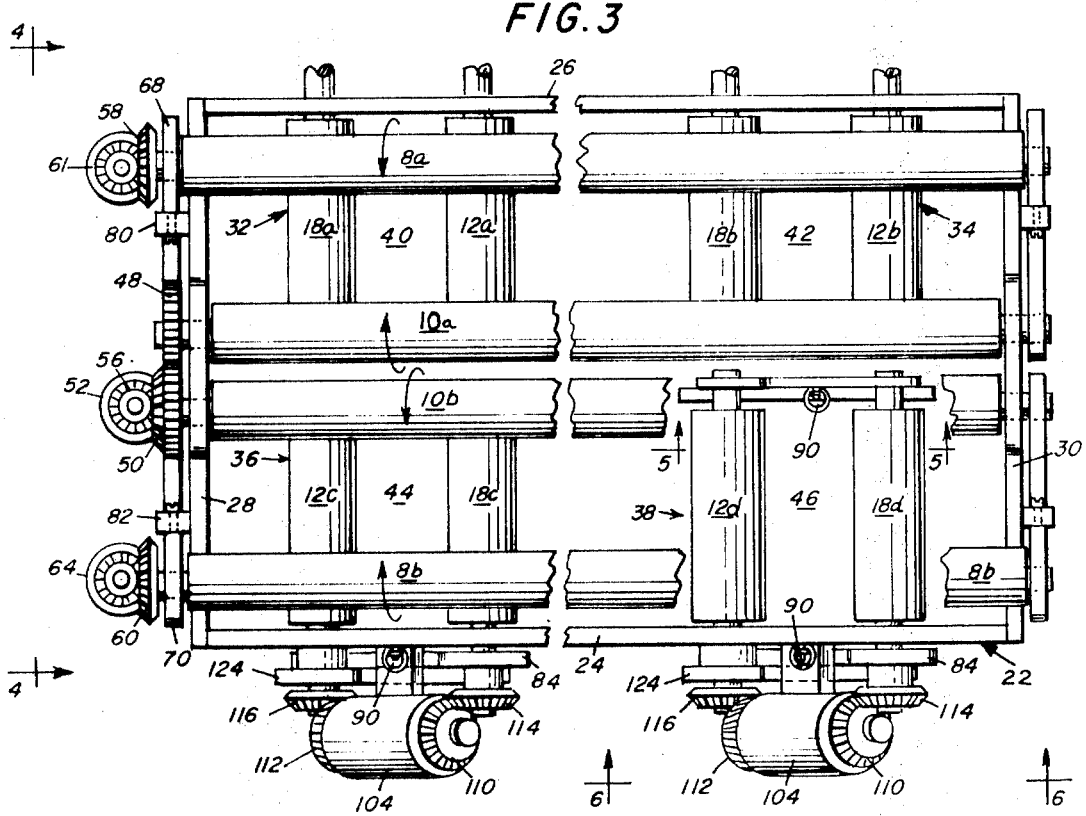
FIG. 3 is an enlarged plan view with parts broken away of an embodiment of this invention in which there are plural sets of devices for manipulating fruit.

The illustrated embodiment of the invention is a fruit harvesting device which has been particularly adapted for use in picking citrus fruits such as oranges and grapefruit. The manner in which it operates on a hanging fruit is illustrated in FIGS. 1A, 1B, and 1C. In FIG. 1A, it will be noted that the fruit 2 is hanging from the branch 4 by means of a substantially vertical stem 6. The initial operation performed by the device of the present invention is a rotation of the fruit at least 45° or to a position where the stem axis is substantially horizontal as shown in FIG. 1B. The stem axis is defined for purposes of this specification as the axis through the center of the fruit which intersects the point at which the stem is connected to the fruit. Then, with the fruit in the position shown in FIG. 1B, the second operation is performed.

This involves the rotation of the fruit about the axis B—B which is inclined from the vertical in order to twist the fruit from the stem. As a practical matter, the fruit is often detached as it reaches the position shown in FIG. 1B. In many instances, however, it is necessary to perform the twisting action illustrated in FIG. 1C in order to remove the fruit from the tree. In almost all cases, rotation of 360° about the axis B—B is ample for the removal of the fruit.

One system of fruit-handling elements which is capable of performing the operation as shown in FIGS. 1A, 1B and 1C is shown diagrammatically in FIG. 2. This system involves an upper pair of cooperating roller members 8 and 10 which engage the fruit and perform the operation shown in FIG. 1B. The roller members 8 and 10 are preferably surfaced with a material which promotes frictional engagement with the fruit, and they may be inflated with a pneumatic or hydraulic agent in order to better engage the fruit being manipulated.

The roller member 8 is positively driven in the direction indicated by the arrow in FIG. 2. Member 10 may be stationary, or positively driven in the opposite direction to, and at a peripheral speed which is less than that of the positively driven roller member 8. As is obvious from FIG. 2, the roller members 8 and 10 are rotatable about horizontal axes and they are spaced apart a distance which is less than the minimum diameter of the fruit which will be picked.

Immediately below the cooperating members 8 and 10 there is a passage for fruit which is defined on one side by a positively driven belt member 12 which is supported on a pair of cylindrical rollers 14 and 16; and on the other side by a transfer roller 18 and a plate member 20. The belt member 12 is positively driven and is spaced from the plate member 20 a distance which is less than the minimum diameter of the fruit to be picked in a manner so that the twisting action illustrated in FIG. 1C will be performed in this portion of the passage. The vertical movement of the peripheral surface of belt 12 is relative to the plate 20 so that, together, these elements serve as the fruit twisting member which effects the final detachment of the fruit from the tree. Of course, the spacing between the cooperating roller members 8 and 10, and the space between the fruit twisting members 12 and 20 must be variable so that the passages for the fruit will be of sufficient dimensions to accommodate any fruit passing through this device. One manner of accomplishing this is set forth hereinbelow.

A practical embodiment of the device of FIG. 2 is illustrated in FIGS. 3–6. FIG. 3 which looks downwardly on the device shows a frame 22 with side members 24 and 26 and end walls 28 and 30 which support roller pairs 8a, 10a, and 8b, 10b as well as the four fruit twisting units designated 32, 34, 36 and 38. These units in cooperation with the roller pairs define the vertical fruit passages 40, 42, 44 and 46 respectively. The various elements of each unit in FIG. 3 carry the same numerical designation used in FIG. 2 with subsequent alphabetical characters used for individual units. Normally, a housing (not shown) will enclose the gearing and motors to prevent the entry of foreign matter into the mechanisms. In the following discussion reference will be made to the elements of fruit passage 46 which have their equivalents in elements of all of the other fruit passages.

Figure 4:
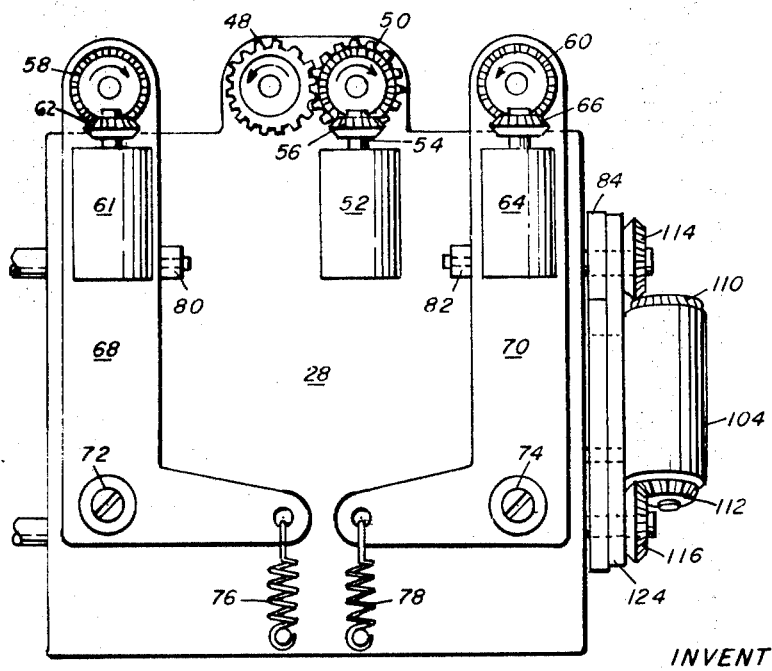
FIG. 4 is an end view of the device shown in FIG. 3 taken along the line 4—4 in FIG. 3.

In passage 46, the means for rotating the fruit to the position shown in FIG. 1B comprises a pair of rollers 8b and 10b which also serve passage 44. These rollers are initially biased to a position so that their spacing is slightly less than the diameter of the minimum size fruit expected. The outermost roller 8b is positively driven at a peripheral velocity greater than that of roller 10b, and it is movable outwardly against spring pressure in order to permit movement of the fruit downwardly through the passage 46. The manner in which the rollers are mounted and driven is illustrated in FIG. 4 which is the end view taken along the line 4—4 in FIG. 3. It will be noted that the slowly rotating rollers 10a and 10b are attached to the gear members 48 and 50. The gear member 50 is a combined bevel and spur gear, with the bevel portion being driven by a motor 52 which has driving shaft 54 connected to a small bevel gear 56. The spur gear portion of gear 50 meshes with the spur gear 48. Spur gears 48 and 50 are directly connected to the rollers 10a and 10b respectively which are rotatably mounted in fixed positions on the end walls 28 and 30. The outermost ends of the faster rotating rollers 8a and 8b are directly connected to bevel gears 58 and 60. Gear 58 is positively driven by a motor 61 and linkage which includes a bevel gear 62, while the bevel gear 60 is driven by motor 64 and bevel gear 66. The rollers 8a and 8b and their respective driving means are supported on mounting plates 68 and 70 which are pivotally mounted on the end wall 28 by means of fasteners 72 and 74. Springs 76 and 78 bias the rollers 8a and 8b inwardly toward the slowly moving rollers 10a and 10b. The extent of the inward movement of the rollers 8a and 8b is limited by adjustable stop means 80 and 82 which are set in accordance with the expected size of the fruit.

The fruit rotating rollers 8a, 8b, 10a and 10b are mounted on the opposite end wall 30 in a manner substantially identical to that illustrated in FIG. 4 but without the driving motors and gear means.

As mentioned above, the fruit rotating rollers 8a, 8b, 10a and 10b each serves two of the fruit twisting units 32, 34, 36 and 38. Thus, there will be occasions where fruit of different sizes will simultaneously be passing through a single set of rollers. For this reason, the bearing means supporting the rollers are universally mounted so that the rollers may incline slightly with respect to each other. This feature is also of significance when a fruit slightly precedes another fruit through the same set of rollers.

Figure 5:
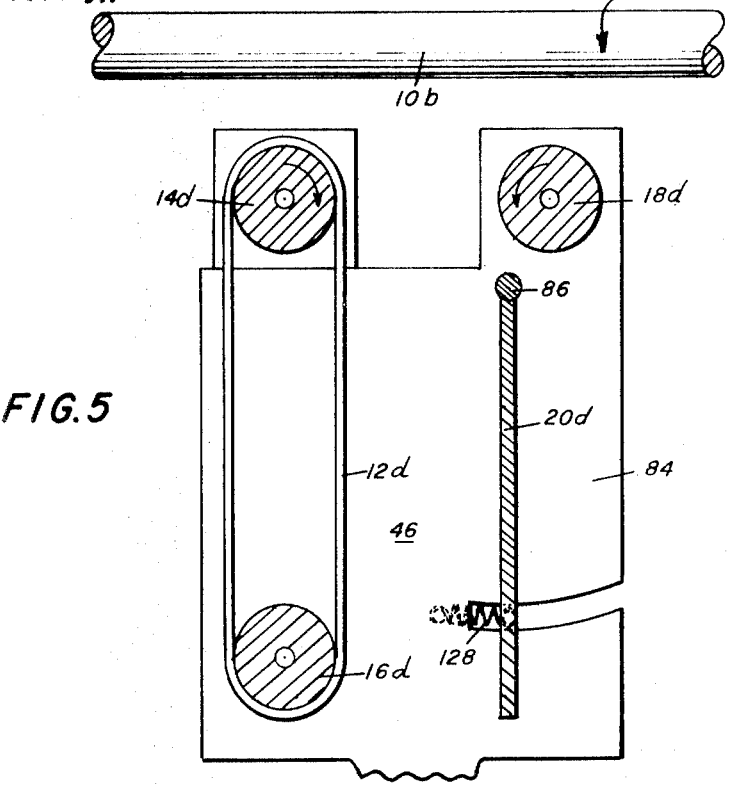
FIG. 5 is a diagrammatic view of the elements of the device as seen in the view taken along line 5—5 of FIG. 3.

The general construction of the fruit twisting means for unit 38 is illustrated in FIG. 5. This twisting means includes the belt 12d which has its peripheral surface moving vertically with respect to the plate 20d which is the cooperating fruit twisting member. The belt 12d is mounted on the spaced apart cylindrical rollers 14d and 16d. The transfer roller 18d is positively driven and is located directly above the plate 20d. It serves to promote transfer of the fruit from the cooperating rollers 8b and 10b to the fruit twisting members 12d and 20d.

The size of the passage 46 between members 12d and 20d is variable in order to permit passage of fruits of various sizes. All of the members related to the fruit twisting members in a single unit are mounted on a common support plate which is resiliently attached to the frame 22 in a manner described below in connection with FIG. 6. The roller 16d is rotatable about an axis fixed with respect to the mounting plate 84, but the uppermost belt-supporting roller 14d is movable toward and away from the roller 18d along an arc, the center of which is the center of rotation of roller 16d. The mechanics of this will best be understood in the following discussion of FIG. 6. The plate 20d has its upper edge attached to a rod 86 which is pivotally mounted on the plate 84. Resilient means 128 urges the plate 20d toward the belt 12d.

Figure 6:
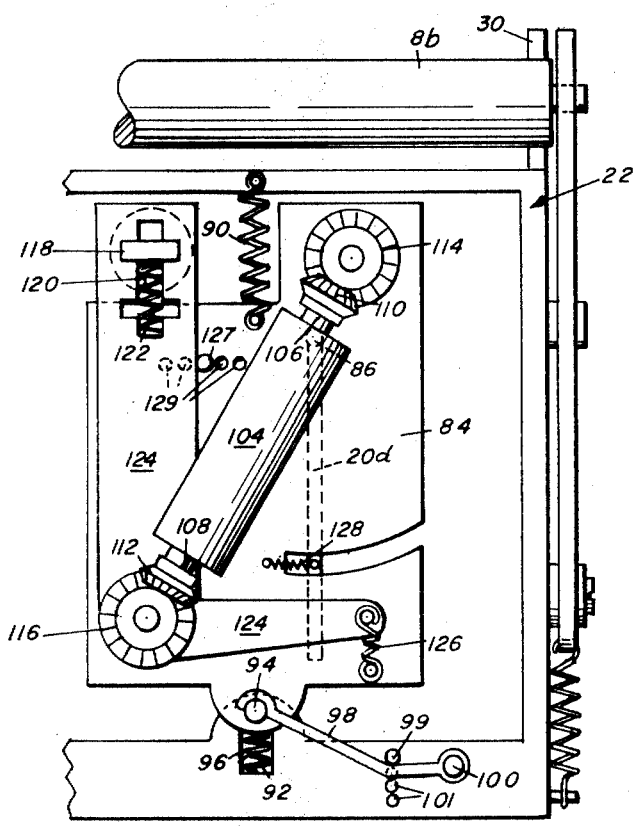
FIG. 6 illustrates certain supporting elements of the machine which are seen in the view taken along line 6—6 of FIG. 3.

Turning, now, to FIG. 6, it will be observed how the various elements shown in FIG. 5 are supported and driven. All are supported either directly or indirectly on one of the mounting plates 84 which are located at opposite ends of the members 12d, 14d, 16d, 18d and 20d. Each of the plates 84 is resiliently supported on the frame 22 by means such as springs 90 and 92. A pin 94 on the mounting plate rides a vertical trackway 96 which is located in the frame 22. An adjustable retainer member 98 which is pivotally mounted at 100 overlies the pin 94 in order to prevent excessive upward movement of the mounting plate 84. A stop member 99 may selectively be placed in any of the plurality of apertures 101 in the frame in order to limit the upward movement of the pin 94 and the mounting plate 84.

The purpose for resiliently mounting each of the units such as fruit twisting unit 38 is to allow the upper end of the unit to be laterally displaced and effectively receives a fruit emerging from rollers 8b and 10b when a fruit that has been engaged by them is not exactly lined up with the passage 46. As the fruit loses contact with rollers 8b and 10b unit 38 will move back to its neutral position under the influence of springs 90 and 92.

Also mounted on the mounting plate 84 is a motor 104 with oppositely extending shafts 106 and 108 which carry bevel gears 110 and 112 respectively. The uppermost bevel gear 110 drivingly engages another bevel gear 114 which is attached to the roller 18d. The roller 18d and the bevel gear 114 are rotatably supported in the mounting plate 84. The lower bevel gear 112 on the motor drives a mating bevel gear 116 which is connected to the lowermost belt supporting roller 16d. Gear 116 and roller 16d are rotatably mounted directly on the mounting plate 84.

The upper belt-supporting roller 14d (FIG. 5) is supported for free rotation on a shaft connected to the member 118. This member is slidably engaged in a slot 120 and is urged upwardly by means of a coil spring 122 in order to maintain uniform tension in the fruit-twisting belt 12d. The upper roller 14d and its shaft are supported by the member 118 on an L-shaped arm 124 which is pivotally mounted for movement about the axis of gear 116. The horizontal leg of the L-shaped arm 124 is biased for movement in a clockwise direction by the coil spring 126 which has its opposite end attached to the mounting plate 84. The extent of this movement is limited by a stop member 127 which may be located in a selected one of the apertures 129. The primary purpose for so supporting the upper belt-supporting roller 14d is to encourage the initial frictional contact of the fruit between the upper end of the belt and the transfer roller 18d. In order to maintain the fruit in frictional engagement with the fruit-twisting belt 12d, the plate 20d is biased theretoward by a coil spring 128 which has its opposite end attached to the mounting plate 84. Of course, the mounting plates 84 are located on both ends of the rollers 14d, 16d and 18d.

From the foregoing description, it will readily be recognized that the unit 38 and all other units of the illustrated embodiment operate in the same general manner as the simple device illustrated in FIG. 2. The supporting and driving means for the elements 12a, 12b, 18a and 18b have been omitted for clarity of illustration. The fruit enters the device and its stem axis is rotated toward the horizontal by the cooperating action of the rollers 8b and 10b which are moving at different peripheral speeds. Then, the fruit is directed between the rollers 14d and 18d and transferred to the zone where it is acted upon by the belt 12d and pivoted plate 20d. These members twist the fruit as shown in FIG. 1C and break it from the stem. The lower end of the frame 22 is open and a chute is attached thereto which carries the fruit to any suitable storage container.

One convenient manner in which these devices may be utilized is shown in FIG. 8. There, a wheeled vehicle 130, such as a truck, moves between rows of trees. Workers are stationed on the ground level and atop the truck 130. Each worker is provided with a pole-supported picking device of the type described above. Each of these picking devices is partially supported by a counterweight mechanism which includes a flexible, vertically pivoted overhead support 132 with one end mounted on the vehicle, and its outer end supporting a flexible cable 134 attached to the various harvesting units. FIG. 8 also shows the flexible chutes 138 which carry the picked fruit into the storage portion on the vehicle 130.

As shown in FIG. 7, each of the picking devices may be pivotally supported at 140 by a bifurcated handle member 142. The electrical supply for the device may come through the cable 146. The hand grips 148 and 149 are attached to opposite ones of the two relatively slidable rods which form the handle 142 so that an operator may turn the device about a vertical axis when manipulating toward a hanging group of fruits.

This constitutes a general description of but one possible embodiment of the invention. Of course, for operation in the field it will be necessary to provide additional braces, supports, housings and perhaps other modifications of the specific embodiment illustrated. It is intended that all such modifications be encompassed within the scope of the claims which follow.

What is claimed is:

1. A fruit picking device for removing fruit from trees of the citrus variety wherein in picking the fruit it usually is separated from its stem at its calyx and in which each fruit has a substantially vertical stem axis when hanging from a tree in its undisturbed condition, said device having first means for rotating said fruit to a position wherein the axis of the stem portion adjacent the fruit is inclined from its substantially-vertical undisturbed condition, and second means for rotating the fruit so inclined about an axis inclined from the vertical to remove the fruit from the stem at its calyx wherein said first means rotates said fruit to a position at which said stem axis portion is substantially horizontal.

2. A fruit picking device according to claim 1 wherein said second means rotates said fruit about a substantially horizontal axis aligned with said stem portion axis.

3. A fruit picking device for removing fruit from trees in which each fruit has a substantially vertical stem axis when hanging from a tree in its undisturbed condition, said device having first means for rotating said fruit to a position wherein said stem axis is inclined from its substantially vertical undisturbed condition, and second means for rotating the fruit so inclined about an axis inclined from the vertical to remove the fruit from the stem, said first means comprises a first cooperating member rotatable about an axis for frictionally engaging a fruit, means rotatably driving said first cooperating member, and a second cooperating member spaced from said first cooperating member by a distance less than the minimum diameter of fruit to be picked for urging a fruit against said first cooperating member.

4. A fruit picking device according to claim 3 wherein said first and second cooperating members are rollers with substantially parallel axes and means for rotatably driving said second cooperating member at a peripheral velocity which is less than that of said first cooperating member.

5. A fruit picking device according to claim 4 wherein one of said cooperating members is movable with respect to the other of said cooperating members in order to vary the distance between said cooperating members, and means resiliently biasing said one of said cooperating members toward the other of said cooperating members.

6. A fruit picking device according to claim 5 wherein the axis of rotation of either of said cooperating members is mounted for movement out of parallelism with the opposite of said cooperating members to permit simultaneous operation on fruits of different sizes.

7. A fruit picking device for removing fruit from trees in which each fruit has a substantially vertical stem axis when hanging from a tree in its undisturbed condition, said device having first means for rotating said fruit to a position wherein said stem axis is inclined from its substantially vertical undisturbed condition, and second means for rotating the fruit so inclined about an axis inclined from the vertical to remove the fruit from the stem, said second means comprises a pair of spaced apart fruit twisting members for rotating a fruit, means for moving one of said fruit twisting members to produce vertical movement of its peripheral surface, which is relative to the surface of the other of said fruit twisting members, biasing means for moving at least one of said fruit twisting members toward a position at which their spaced-apart distance is less than the diameter of the smallest fruit to be picked.

8. A fruit picking device according to claim 7 wherein said first means rotates said fruit to a position at which said stem axis is substantially horizontal.

9. A fruit picking device according to claim 8 wherein said second means rotates said fruit about a substantially horizontal axis aligned with said stem axis.

10. A fruit picking device according to claim 7 wherein said first means comprises a first cooperating member rotatable about an axis for frictionally engaging a fruit, means rotatably driving said first cooperating member, and a second cooperating member spaced from said first cooperating member by a distance less than the minimum diameter of fruit to be picked for urging a fruit against said first cooperating member.

11. A fruit picking device according to claim 10 wherein said first and second cooperating members are rollers with substantially parallel axes and means for rotatably driving said second cooperating member at a peripheral velocity which is less than that of said first cooperating member.

12. A fruit picking device according to claim 11 wherein one of said cooperating members is movable with respect to the other of said cooperating members in order to vary the distance between said cooperating members and means resiliently biasing said one of said cooperating members toward the other of said cooperating members.

13. A fruit picking device according to claim 11 wherein the axis of rotation of either of said cooperating members is mounted for movement out of parallelism with the opposite of said cooperating members to permit simultaneous operation on fruits of different sizes.

14. A fruit picking device according to claim 7 wherein said one of said fruit twisting members is an endless belt supported on spaced apart cylindrical rollers.

15. A fruit picking device according to claim 14 having a support member supporting said fruit twisting members, one of said spaced apart cylindrical rollers rotatably mounted in said support member, and the other of said cylindrical rollers is radially movable with its axis of rotation remaining at a constant distance from the axis of rotation of said one of said spaced apart cylindrical rollers.

16. A fruit picking device according to claim 14 wherein the other of said fruit twisting members is a plate member.

17. A fruit picking device according to claim 16 wherein said plate member is pivotally attached at its upper portion to said support member.

18. A fruit picking device according to claim 17 wherein the lowermost of said cylindrical rollers is rotatably mounted in said support member, and the uppermost of said cylindrical rollers is radially movable with its axis of rotation remaining at a constant distance from the axis of rotation of said one of said spaced apart cylindrical rollers.

19. A fruit picking device according to claim 16 having a positively driven transfer roller directly above said plate member and extending horizontally from and parallel to the uppermost cylindrical roller, and biasing means yieldably maintaining said uppermost cylindrical roller and said transfer roller in positions wherein their spaced apart distance is less than the diameter of the smallest fruit to be picked.

20. A fruit picking device according to claim 19 having a common means for driving said belt and said transfer roller at an equal peripheral velocity.

References Cited

UNITED STATES PATENTS

| | | | |
|---|---|---|---|
| 2,698,508 | 1/1955 | Hollister | 56—332 |
| 2,775,088 | 12/1956 | Bullock | 56—332 |
| 2,968,907 | 1/1961 | Bernheim et al. | 56—332 |
| 2,968,141 | 1/1961 | McGough | 56—332 |
| 3,129,551 | 4/1964 | Lasswell | 56—328 |
| 3,164,942 | 1/1965 | Middlesworth et al. | 56—328 |

RUSSELL R. KINSEY, Primary Examiner